UNITED STATES PATENT OFFICE.

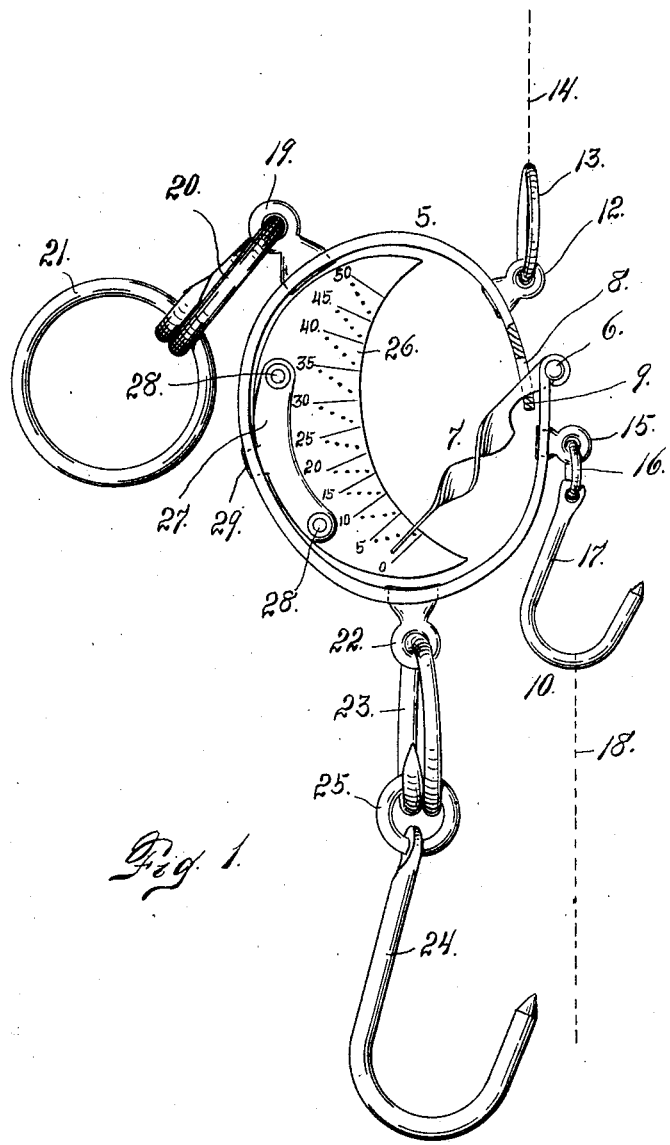

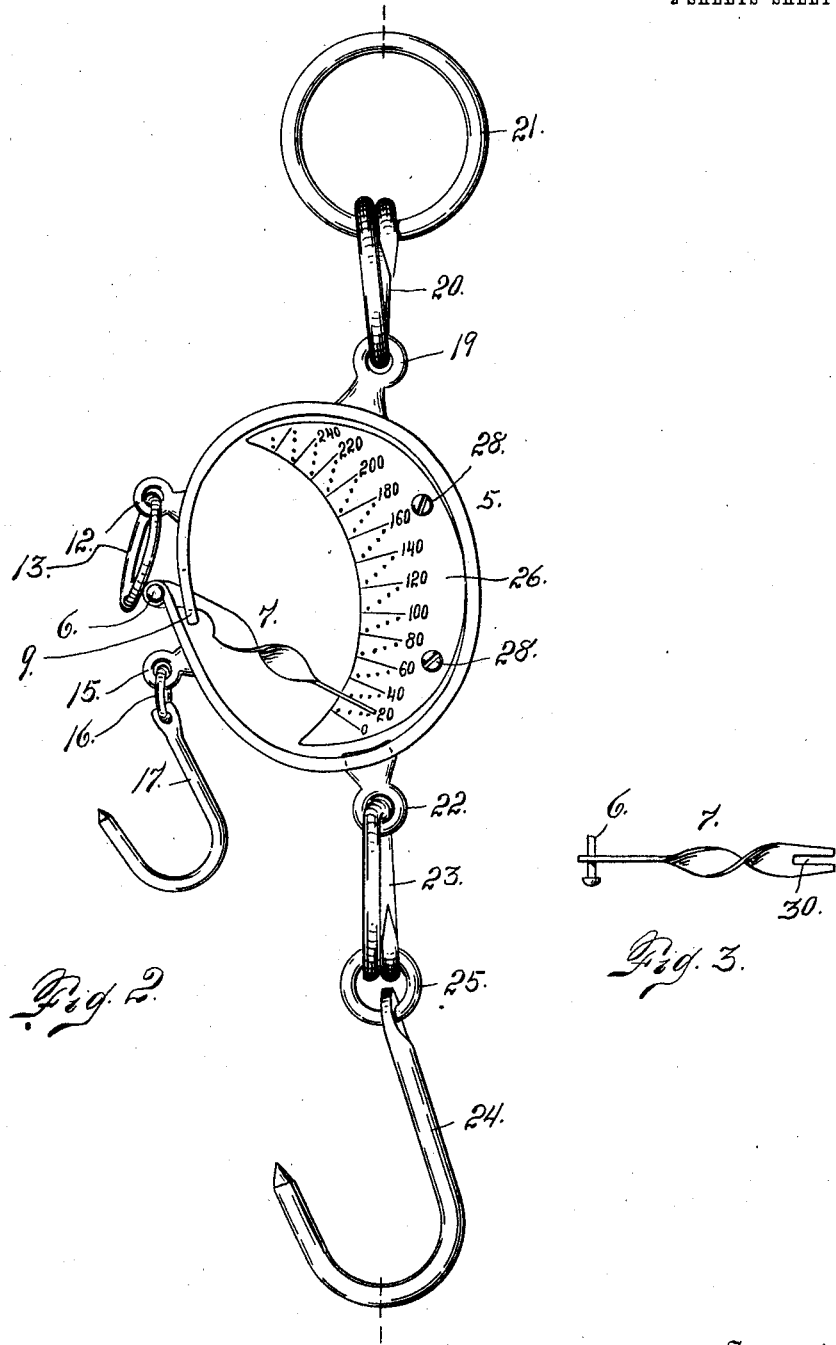

JOHN A. McGUIRE, OF DENVER, COLORADO.

WEIGHING-SCALE.

1,001,666.  Specification of Letters Patent. Patented Aug. 29, 1911.

Application filed August 4, 1908. Serial No. 446,979.

*To all whom it may concern:*

Be it known that I, JOHN A. MCGUIRE, a citizen of the United States, residing in the city and county of Denver and State of Colorado, have invented certain new and useful Improvements in Weighing-Scales; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in weighing scales and belongs to that class of weighing instruments usually employed for weighing articles of relatively small mass. The device is suspended from a suitable support and the article to be weighed is connected thereto in operative relation.

My present invention consists of an open band formed approximately circular, the extremities of the band normally overlapping each other preferably. Connected with one extremity of the band is a pointer whose free end moves over, or in suitable proximity to a graduated dial, the latter being suitably calibrated. As shown in the drawing, this pointer is pivotally connected with one of the overlapping extremities of the band and passes through a slot formed in the opposite extremity of the band, the lower end of the band where it bounds the slot, forming a fulcrum for the pointer. The pointer is actuated by connecting one end of the band with a stationary support, from which the device is suspended; and then attaching the article to be weighed to the other end of the band. The line of support and the line of pull of the article to be weighed are out of line the one with the other. The two extremities of the band are actuated in a direction to separate them, according to the magnitude of the article to be weighed; and the greater the separation of the spring band extremities, the greater will be the movement of the pointer over its graduated dial.

In my improved construction, provision is made for weighing two classes of articles, the one class being of less magnitude than the other. This result is brought about by providing the spring ring with suspension devices located at different points, and also with correspondingly located devices to which the article to be weighed may be attached. In the one instance an article of relatively small magnitude will impart considerable movement to the indicator or pointer, while in the other instance, an article of relatively larger magnitude will impart a corresponding movement. Hence, the dial contains two sets of graduations, one on each side thereof and differently calibrated. When the articles of less magnitude are weighed, the scale is held so that the observer may see the face of the dial which is graduated for weighing smaller articles, while when the larger articles are weighed, their gravity is indicated on the opposite side of the scale.

Having briefly outlined my improved construction, I will proceed to describe the same in detail, reference being made to the accompanying drawing in which is illustrated an embodiment thereof.

In this drawing, Figure 1 is an elevation partly in section showing my improved scale with the side of the dial exposed, upon which the weight of relatively small articles is indicated. Fig. 2 is a similar view, showing the opposite side of the scale. Fig. 3 is a detail view, illustrating the pointer, or indicating device.

The same reference characters indicate the same parts in all the views.

Let the numeral 5 designate a band, preferably composed of spring metal. This band is approximately circular in shape and its opposite extremities slightly overlapping each other. Pivotally connected with one extremity of the band, as shown at 6, is a pointer or indicator 7, which consists preferably of a metal arm which is made spiral a portion of its length to increase its rigidity. This pointer passes through an opening 8 formed in the opposite side of the spring band, the pointer normally resting upon a part 9 of the band just below the slot or opening 8. When the band is in its normal position, the pointer rests upon the extremity 9 of the band and occupies a position at the lower or zero extremity, of the scale. In Fig. 1 it may be assumed that sufficient force is applied to the suspension hook 10, to impart a slight movement to the pointer, since the latter indicates such a condition; or, in other words, is slightly removed from the zero mark of the scale, which is graduated to weigh articles not exceeding 50 pounds in weight.

The pointer is provided at its pivotal extremity with a reduced portion (6') forming a shoulder (7') whereby the pointer serves to hold the extremities of the ring together, and the slotted extremity of the ring is prevented from disengagement with the pointer, under the influence of the weight of the article to be weighed.

As shown in the drawing, the spring band is provided just above its separated extremities with an eye 12, with which is connected a suspension ring 13. This ring may be connected with any suitable stationary support. In this event the direction of suspension is supposed to be vertical, as indicated by the dotted line 14. The opposite extremity of the spring band is provided with an eye 15, with which is connected a small ring 16 to which is attached a hook 17 with which articles to be weighed may be connected. The dotted line 18 leading downwardly from the hook, indicates the line of pull of the article to be weighed.

Assuming now that the device is suspended by the ring 13 and that an article having a mass of 50 pounds is attached to the hook 10, the open extremities of the band will be separated sufficiently to cause the pointer 7 to move over the face of the dial exposed in Fig. 1, from zero to 50. The spring band is further provided with an eye 19, farther removed from the slotted extremity of the band than the eye 12. Directly connected with the eye 19, is a ring 20, while a second ring 21 is connected with the ring 20. This ring 21 may be connected with a stationary support (not shown), in which event the device is suspended in the manner illustrated in Fig. 2. The band is also provided with an eye 22, which is farther removed from its slotted end than the eye 15. Directly connected with the eye 22 is a fastening ring 23. A hook 24 is connected with the ring 23 by a smaller ring 25.

Assuming that the ring 21 is connected with a suitable stationary support, and that an article to be weighed is placed upon the hook 24, the extremities of the spring band will be separated according to the gravity of the article to be weighed, and the pointer 7 will be caused to move over the face of the graduated dial exposed in Fig. 2. When the pointer stops, its position indicates the weight of the article.

It is evident that an article connected with the hook 10 when the device is suspended from the ring 13, will impart a considerably greater movement to the pointer 7 than when the same article is attached to the hook 24, while the ring 21 is connected with a stationary support. Hence, it is evident that the instrument must be calibrated at two different scales which are respectively used according to the different positions in which the instrument may be held.

As shown in the drawing, the dial, which is indicated by the numeral 26, is crescent-shaped and suitably secured on the inner surface of the spring band 5. In the special construction shown, to this dial plate is attached a small bar 27 by means of screws 28, the bar 27 being in turn riveted to the band, as shown at 29. The pointer 7 is provided at its free extremity with a slot 30 which receives the inner edge of the dial 26, the dial forming a guide for the pointer, as the latter is actuated during the operation of weighing.

Attention is called to the fact that beyond the point of attachment in both directions or toward the horns of the crescent, the dial is free from the spring band, the space increasing in each direction from the rivet 29 where the dial is tangential to the band. This construction allows the band perfect freedom of movement when the device is in use.

Having thus described my invention, what I claim is:

1. A weighing device, comprising a spring ring having its extremities separated, a dial plate having a bar attached thereto, the said bar being applied to the inner surface of the ring at one point only, a pointer pivotally connected on the one extremity of the ring, the opposite extremity of the ring having a slot through which the pointer passes to form a fulcrum, whereby as the ring extremities are separated, the pointer extremity is actuated, the extremity of the pointer nearest the pivotal point having a reduced portion forming the shoulder, to prevent disengagement with the slot, and the free extremity of the pointer being slotted to straddle the dial plate, which forms the guide for the said pointer, substantially as described.

2. A weighing device, comprising a spring ring having its extremities separated, a curved dial plate having a bar attached thereto, the said bar being secured to the ring at one point only, and supporting the dial on the inner surface of the ring and tangentially therewith at the point of attachment, beyond which point in both directions the dial is free from the ring, a pointer pivotally connected with one extremity of the ring and engaging the other extremity, the pointer occupying a position in operative relation with the dial, the ring being provided with suspending means, and means for attaching articles to be weighed.

In testimony whereof I affix my signature in presence of two witnesses.

JOHN A. McGUIRE.

Witnesses:
EUGENE A. CHILDE,
M. GRINNELL.

Copies of this patent may be obtained for five cents each, by addressing the "Commissioner of Patents, Washington, D. C."